United States Patent
Wu (10) Patent No.: US 12,220,062 B1
(45) Date of Patent: Feb. 11, 2025

(54) HYDRAULIC BUFFERING LEG CUSHION

(71) Applicant: Yi-Chang Wu, Taoyuan (TW)

(72) Inventor: Yi-Chang Wu, Taoyuan (TW)

( * ) Notice: Subject to any disclaimer, the term of this patent is extended or adjusted under 35 U.S.C. 154(b) by 0 days.

(21) Appl. No.: 18/367,099

(22) Filed: Sep. 12, 2023

(30) Foreign Application Priority Data

Jul. 20, 2023 (TW) ................................. 112207601

(51) Int. Cl.
*A47C 31/00* (2006.01)
*A47B 91/02* (2006.01)
(Continued)

(52) U.S. Cl.
CPC ............ *A47C 31/004* (2013.01); *A47B 91/04* (2013.01); *A47B 91/024* (2013.01);
(Continued)

(58) Field of Classification Search
CPC ......... A47C 31/004; A47C 3/20; A47B 91/04; A47B 91/024; A47B 2220/0027; F16M 11/24; F16M 2200/08
See application file for complete search history.

(56) References Cited

U.S. PATENT DOCUMENTS 10,745,850 B2 * 8/2020 Zhao ..................... F16M 7/00
10,920,360 B2 * 2/2021 Zhao ..................... F16F 15/022
(Continued)

FOREIGN PATENT DOCUMENTS

CN 219823560 U * 10/2023
EP 3756509 A1 * 12/2020 ............ A47B 91/16

*Primary Examiner* — Eret C McNichols
*Assistant Examiner* — Ding Y Tan
(74) *Attorney, Agent, or Firm* — BACON & THOMAS, PLLC (57) ABSTRACT

A hydraulic buffering leg cushion is mounted to a supporting platform. The hydraulic buffering leg cushion includes a leg cushion body, a movable unit, and a fixed connecting member. The leg cushion body is provided with a leg cushion accommodating space, and includes an upper cover, and a lower cover. The movable unit is received in the leg cushion accommodating space, and includes a piston, a membrane assembly, a rubber bowl, and a movable portion. The rubber bowl is clamped, at its outer circumference, by and between the upper cover and the lower cover, so as to partition a damping accommodating space for receiving damping oil. The movable portion and the rubber bowl are pressed, in sequence, onto the piston. The piston is provided with a damping channel, and is connected with the lower cover through a restoring spring. The membrane assembly is disposed underneath the piston, and forms, with the piston, a one-way valve structure. The restoring spring passes through the membrane assembly. The fixed connecting member is fixedly arranged on the movable portion of the movable unit. As such, by using the supporting force of the restoring spring and the damping oil in the damping accommodating space for providing with buffering hydraulic pressure, a balance for the supporting platform can be adjusted automatically to a balance within an effective range for the supporting platform, without the need of a manual adjustment for a balance. This will ensure stability of the supporting platform without shaking easily.

6 Claims, 6 Drawing Sheets

(51) Int. Cl.
*A47B 91/04* (2006.01)
*A47C 3/20* (2006.01)
*F16M 11/24* (2006.01)

(52) U.S. Cl.
CPC ......... *A47B 2220/0027* (2013.01); *A47C 3/20* (2013.01); *F16M 11/24* (2013.01); *F16M 2200/08* (2013.01)

(56) References Cited

U.S. PATENT DOCUMENTS

| | | | |
|---|---|---|---|
| 10,975,511 B2 * | 4/2021 | Zhao | A47B 91/16 |
| 11,209,068 B2 * | 12/2021 | Gaudet | F16F 9/16 |
| 2010/0237205 A1 * | 9/2010 | Hirsh | A47C 7/008 |
| | | | 248/188.4 |
| 2024/0225277 A1 * | 7/2024 | Wu | A47B 91/04 |

* cited by examiner

HYDRAULIC BUFFERING LEG CUSHION

CROSS-REFERENCE TO RELATED APPLICATIONS

This application claims the benefits of the Taiwan Patent Application Serial Number 112207601, filed on Jul. 20, 2023, the subject matter of which is incorporated herein by reference.

BACKGROUND

Field of the Disclosure

The present invention relates to a hydraulic buffering leg cushion, and more particularly, to a hydraulic buffering leg cushion adapted for supporting a platform.

Description of Related Art

Normally a table may be shaking, if one of the legs of table fails to touch the floor when in the occasion of uneven floor, differences in the length of legs, or during moving the table. In such an occasion, upon impacting the table, the objects on the table will likely tip over, so as to make users feel disturbed. Currently on the market, there are two types of leg cushions, one is a fixed type, the other an adjustable type. Even the adjustable-type leg cushion still needs a manual manipulation to swivel a nut for height adjustment. This, however, is troublesome and makes users feel uncomfortable.

Conventionally, to make cushion legs achieve a self-balancing effect, without the need of a manual adjustment for a balance, a hydraulic buffering leg cushion, similar to the present invention, has been developed by a manufacturer. This conventional art, however, has its disadvantages, namely a shorter effective height adjustment, resulting in a smaller range of automatic balancing adjustment. Besides, this conventional art has a buffering structure in which damping oil flows through the same channel no matter whether damping oil in the buffering structure is in a status of downward pressing, or in a status of upward recovering. In view of the fact that the speed of upward recovery is determined by the elastic force of restoring springs, a larger spring is therefore necessary so as to make the parameters more simple.

Given the above, with a spirit of aggressive innovation to solve such problems as mentioned, a "Hydraulic Buffering Leg Cushion" is conceptualized, and with persistent research and experiments, the present invention can be accomplished eventually.

SUMMARY

An object of the present invention is to provide a hydraulic buffering leg cushion, such that through a structural design of the present invention, a supporting platform, which is mounted with the hydraulic buffering leg cushion, can adjust automatically to a balance for the supporting platform within an effective range, and there is no need for a manual adjustment for such balance. This will ensure stability of the supporting platform without shaking easily. Further, in the hydraulic buffering leg cushion, according to the present invention, a piston and a membrane assembly form with a one-way valve structure, making the one-way valve structure closed as a movable unit is pressed down; and otherwise, making the one-way valve structure opened as the movable unit recovers to uprising. As such, damping oil has different flowing passages under the circumstances of pressing downward or recovery uprising of the movable unit, so as to enhance sensitivity of height adjustment of the supporting table. This will make the present invention suitable for a supporting table with a smaller-size restoring spring and with a lighter weight thereof.

To achieve the purpose of the above-mentioned object, the hydraulic buffering leg cushion, according to the present invention, is mounted to a supporting platform. The hydraulic buffering leg cushion comprises a leg cushion body, a movable unit, and a fixed connecting member. The leg cushion body is provided with a leg cushion accommodating space, and includes an upper cover, and a lower cover, wherein the upper cover is arranged on the lower cover. The movable unit is received in the leg cushion accommodating space, and includes a piston, a membrane assembly, a rubber bowl, and a movable portion. The rubber bowl is clamped, at its outer circumference, by and between the upper cover and the lower cover, so as to partition a damping accommodating space for receiving damping oil. The damping accommodating space includes a first damping accommodating space located above the piston, and a second damping accommodating space located below the piston. The movable portion and the rubber bowl are pressed, in sequence, onto the piston. The piston is provided with a damping channel for communicating with the first damping accommodating space and with the second damping accommodating space. The membrane assembly is disposed underneath the piston, so as to press against the piston and to make the damping channel unable to communicate with the first damping accommodating space and the second damping accommodating space; or on the other hand, the membrane assembly does not press against the piston so as to make the damping channel communicate with the first damping accommodating space and the second damping accommodating space. The piston is connected with the lower cover through a restoring spring, where the restoring spring passes through the membrane assembly. The fixed connecting member is fixedly arranged on the movable portion of the movable unit.

According to the present invention, the membrane assembly includes a membrane sheath, and a membrane piece which is sleeved to the membrane sheath, so as to form, with the piston, a one-way valve structure.

Further, according to the present invention, the lower cover is provided underneath with a rubber pad so as to reduce noise occurred when bottom of the hydraulic buffering leg cushion contacts the floor, and to achieve the purpose of buffering effect.

Still further, according to the present invention, the movable portion is provided with a hook for engaging with a flange around inner circumference of the upper cover, so as to refrain from elastic recovery force of the restoring spring, and to limit utmost height that the movable portion can adjust.

According to the present invention, the fixed connecting member relates to a setscrew. As such, the setscrew serves to threadedly fasten the hydraulic buffering leg cushion to the supporting platform, so as to help adjust automatically balance of the supporting platform.

Further, according to the present invention, the lower cover has a bottom with a diameter greater than a diameter of top of the upper cover. Therefore, with the help of the increasing diameter of the bottom of the lower cover, an increasing dimension of contact with the floor can be obtained. This will more satisfy the anti-slip character of the hydraulic buffering leg cushions; and moreover, a better stability can be maintained for the supporting table if there are potholes on the floor.

Other objects, advantages, and novel features of the invention will become more apparent from the following detailed description when taken in conjunction with the accompanying drawings.

DETAILED DESCRIPTION OF EMBODIMENT

Figure 1:
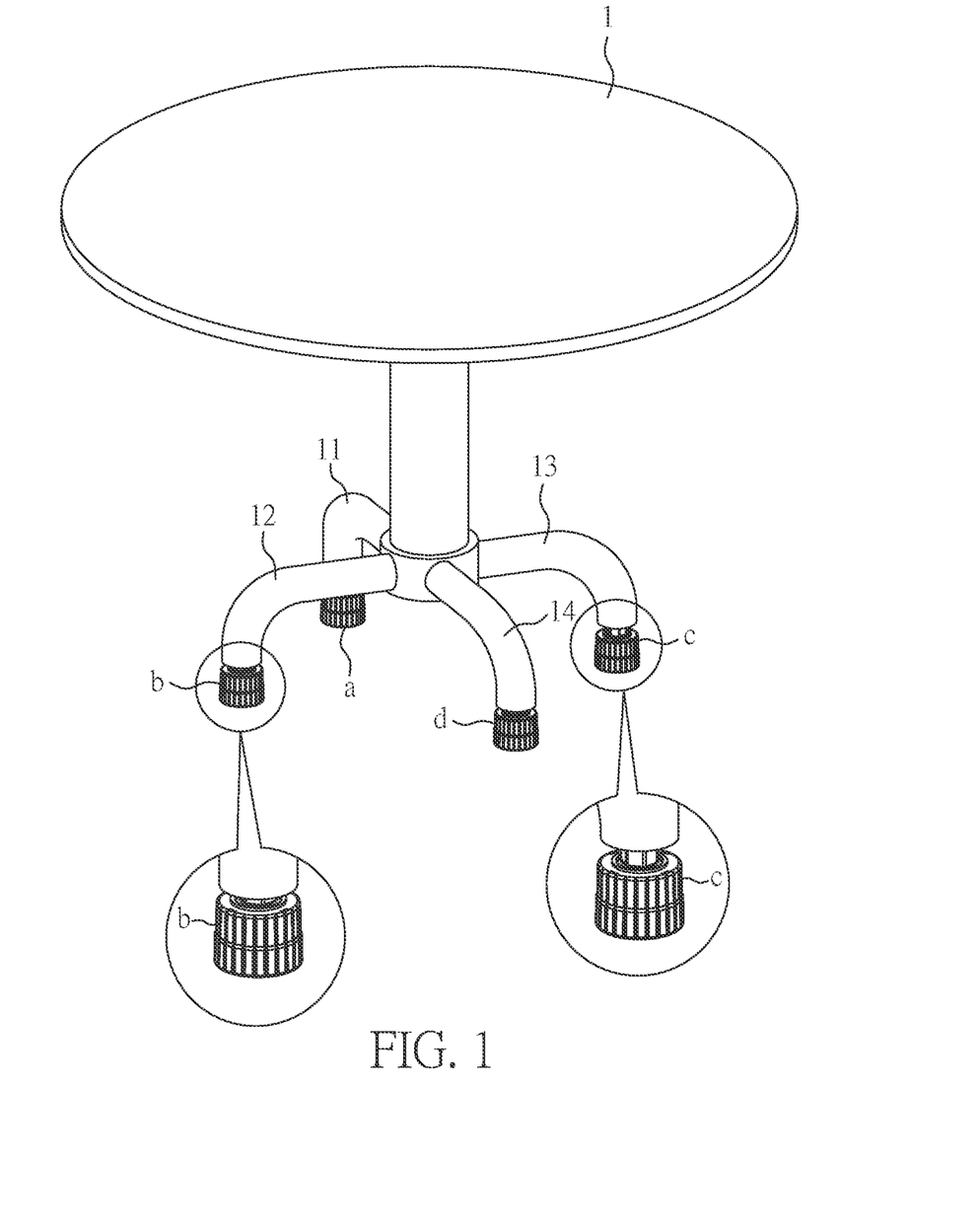
FIG. 1 is a perspective view illustrating hydraulic buffering leg cushions, according to the present invention, arranged underneath a supporting platform.

A reference is made to FIG. 1, a perspective view illustrating hydraulic buffering leg cushions, according to the present invention, arranged underneath a supporting platform. As shown, there are the supporting platform 1, two fixed leg cushions a, d, and two hydraulic buffering leg cushions b, c. The supporting platform 1 relates to a table having four supporting legs 11, 12, 13, 14, wherein the two supporting legs 11, 14 are mounted with the fixed leg cushions a, d, respectively, while the other two supporting legs 13, 13 are mounted with the hydraulic buffering leg cushions b, c, respectively, though not so limited. Namely, the supporting platform 1 may be a chair with plural supporting legs, or other platform structure with plural supporting legs. Among them, sides of the table having the fixed leg cushions a, d, and unable to proceed with adjustment of height, refer to fixed sides; whereas other sides of the table having the hydraulic buffering leg cushions b, c, and able to proceed with adjustment of height automatically, refer to active sides. According to the present invention, the hydraulic buffering leg cushions b, c each have an effective height of adjustment H (see FIG. 4), namely 7 mm (even if the supporting platform 1 has a flatness drop of 7 mm relative to floor surface, the supporting platform 1 can still maintain a balance without shaking), though not so limited, and may be of other numerical values.

According to the present invention, also referring to FIG. 1, the hydraulic buffering leg cushion b is subject to a compression status, indicating that the supporting leg 12 stands on a higher floor. Since the hydraulic buffering leg cushion b initially bears a compression against the floor, it adjusts to a lower height automatically till a status of balance, so as to maintain flatness of the supporting platform 1. In contrast, the hydraulic buffering leg cushion c stands in a status of stretching, indicating a lower height of floor surface that the supporting leg 13 is positioned. This is because initially the hydraulic buffering leg cushion c has not yet touched the floor and has not yet been compressed, and the hydraulic buffering leg cushion c will adjust height of the supporting leg 13 till the hydraulic buffering leg cushion c touches the floor, so as to maintain flatness of the supporting platform 1. As such, under the circumstances of uneven floor, the two hydraulic buffering leg cushions b, c can stretch or retract automatically. Namely, in the case that the floor is uneven, the two active hydraulic buffering leg cushions b, c can adjust automatically the height of the two supporting legs 12, 13, so as to ensure that all the four leg cushions a, b, c, d can maintain in contact with the floor, so as to assure balance and unshaking of the supporting table 1. Even if one contacts the supporting table 1 unintentionally, the supporting table 1 will not shake easily, because the two hydraulic buffering leg cushions b, c bear strong damping effects.

Figure 2A:
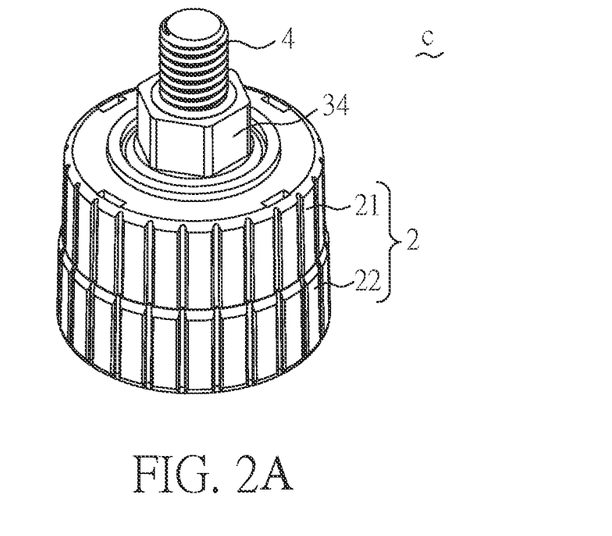
FIG. 2A is a perspective view illustrating a hydraulic buffering leg cushion according the present invention.
Figure 2B:
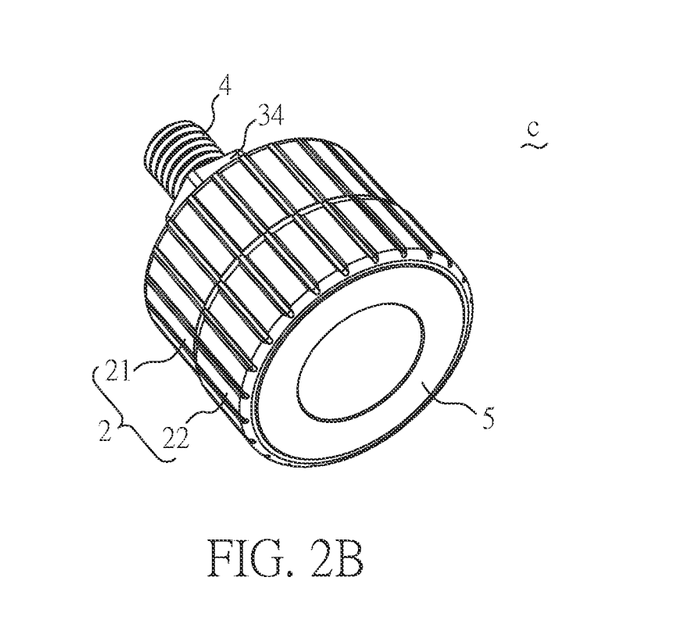
FIG. 2B is a perspective view illustrating the hydraulic buffering leg cushion, from another angle of view, according the present invention.
Figure 3:
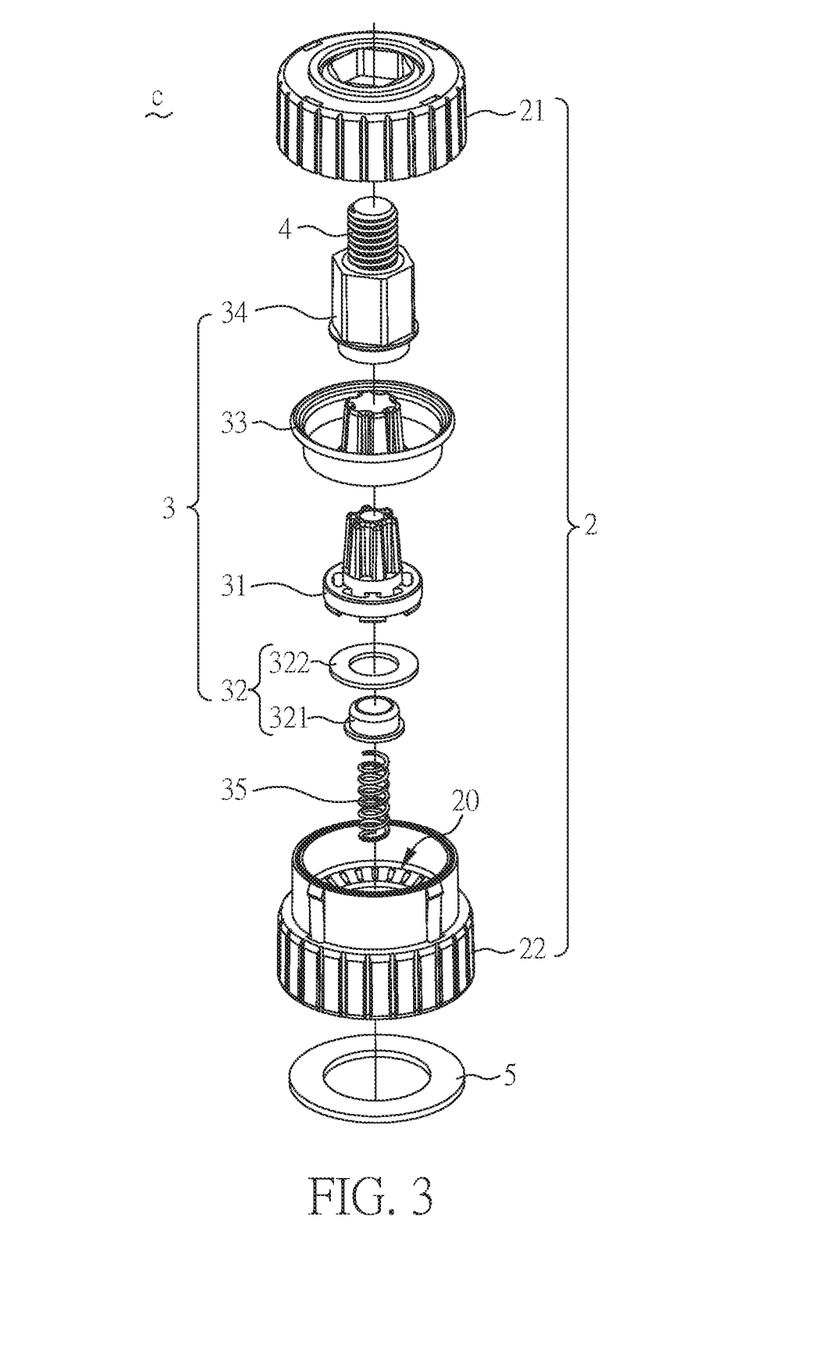
FIG. 3 is an exploded view illustrating the hydraulic buffering leg cushion according to the present invention.
Figure 4:
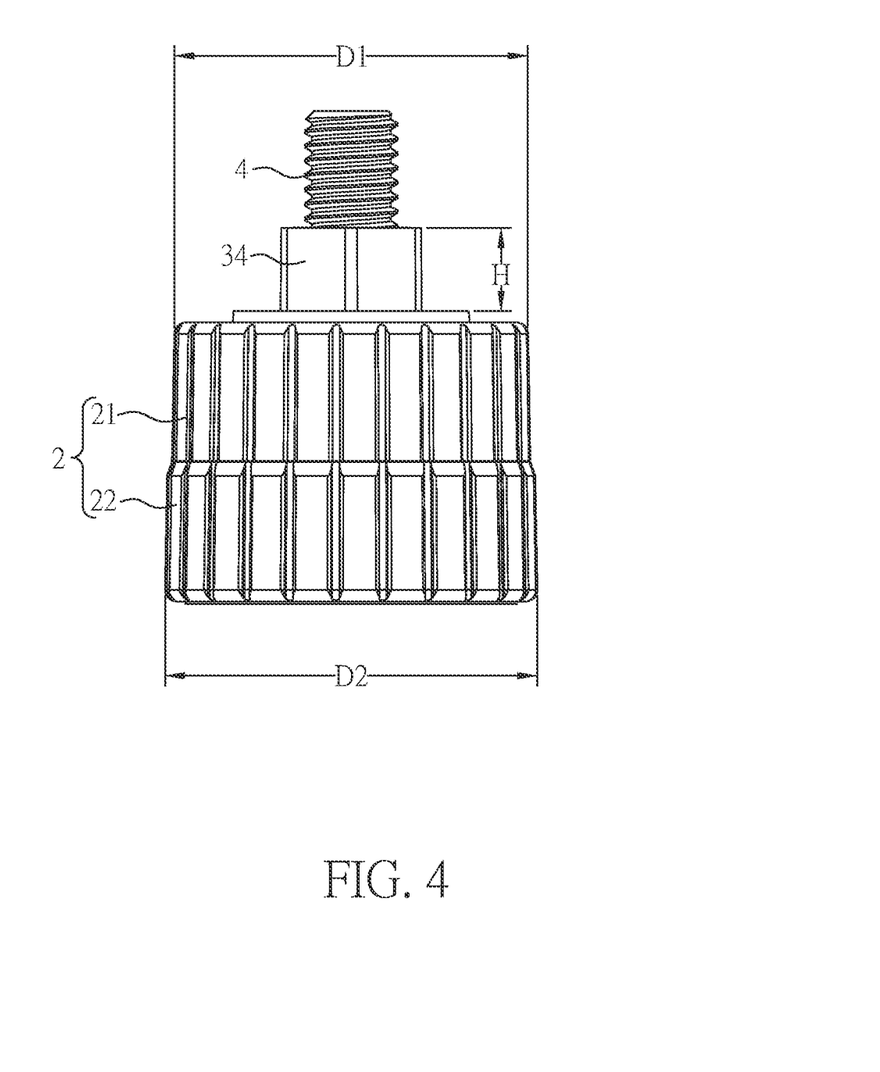
FIG. 4 is a side view illustrating the hydraulic buffering leg cushion according to the present invention.
Figures 5, 5A:
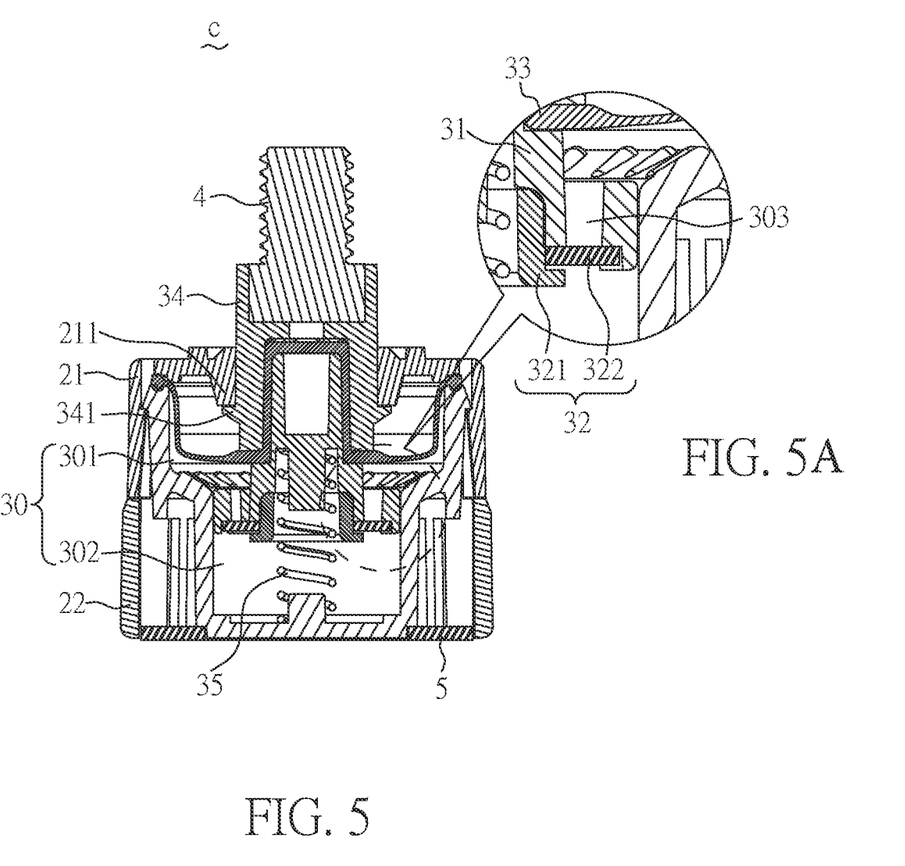
FIG. 5 is a cross-sectional view illustrating the hydraulic buffering leg cushion according to the present invention.
FIG. 5A is an enlarged view for part of FIG. 5 as indicated.

Further references are made to FIG. 2A, a perspective view illustrating the hydraulic buffering leg cushion c according the present invention; FIG. 2B, a perspective view illustrating the hydraulic buffering leg cushion c, from another angle of view; FIG. 3, an exploded view illustrating the hydraulic buffering leg cushion c; FIG. 4, a side view illustrating the hydraulic buffering leg cushion c; FIG. 5, a cross-sectional view illustrating the hydraulic buffering leg cushion c; and FIG. 5A, an enlarged view for part of FIG. 5 as indicated. As shown, the hydraulic buffering leg cushion c comprises a leg cushion body 2, a movable unit 3, and a fixed connecting member 4. The leg cushion body 2 is provided with a leg cushion accommodating space 20, and includes an upper cover 21, and a lower cover 22, wherein the upper cover 21 is arranged on the lower cover 22, and is provided with a flange 211 around inner circumference thereof (see FIG. 5). Besides, the lower cover 22 is provided underneath with a rubber pad 5 so as to reduce noise occurred when bottom of the hydraulic buffering leg cushion c contacts the floor, and to achieve the purpose of buffering effect. As shown in FIG. 4, the lower cover 22 has a bottom with a diameter D2 greater than a diameter D1 of top of the upper cover 21. Therefore, with the help of the increasing diameter D2 of the bottom of the lower cover 22, an increasing dimension of contact with the floor can be obtained. This will more satisfy the anti-slip character of the hydraulic buffering leg cushions; and moreover, a better stability can be maintained for the supporting table 1 if there are potholes on the floor.

Still further, according to the present invention, the movable unit 3 is received in the leg cushion accommodating space 20, and includes a piston 31, a membrane assembly 32, a rubber bowl 33, and a movable portion 34. The rubber bowl 33 is clamped, at its outer circumference, by and between the upper cover 21 and the lower cover 22, so as to partition a damping accommodating space 30 for receiving damping oil. The damping accommodating space 30 includes a first damping accommodating space 301 located above the piston 31, and a second damping accommodating space 302 located below the piston 31. The piston 31 is provided with a damping channel 303 for communicating with the first damping accommodating space 301 and with the second damping accommodating space 302. The movable portion 34 and the rubber bowl 33 are pressed, in sequence, onto the piston 31 such that both can move synchronously therewith. Further, the membrane assembly 32 includes a membrane sheath 321, and a membrane piece 322 which is sleeved to the membrane sheath 321; where the membrane assembly 32 is disposed underneath the piston 31, so as to form, with the damping channel 303, a one-way valve structure. Namely, the membrane assembly 32 can press against the piston 31 so as to make the damping channel 303 unable to communicate with the first damping accommodating space 301 and the second damping accommodating space 302; or on the other hand, the membrane assembly 32 does not press against the piston 31 so as to make the damping channel 303 communicate with the first damping accommodating space 301 and the second damping accommodating space 302. The piston 31 is connected with the lower cover 22 through a restoring spring 35, where the restoring spring 35 passes through the membrane assembly 32, so as to make the movable unit 3 able to move longitudinally and linearly in the leg cushion accommodating space 20. This provides an effective height adjustment, and helps the movable unit 3 recover to a non-loading position. Besides, in order to prevent the restoring spring 35 from an over-bounce, the movable portion 34 is provided with a hook 341 for engaging with the flange 211, so as to refrain from the elastic recovery force of the restoring spring 35, and to limit the utmost height that the movable unit 3 can adjust.

According to the present invention, the fixed connecting member 4 is fixedly arranged on the movable portion 34, where the fixed connecting member 4 relates to a setscrew. As such, the setscrew serves to threadedly fasten the hydraulic buffering leg cushion c to the supporting platform 1, so as to help adjust automatically balance of the supporting platform 1.

Figure 6A:
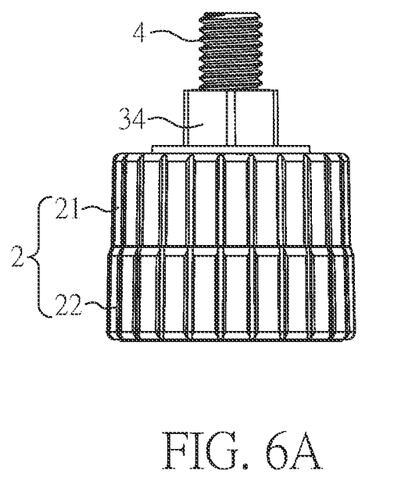
FIG. 6A is a side view illustrating the hydraulic buffering leg cushion, before compression thereof, according to the present invention.
Figure 6B:
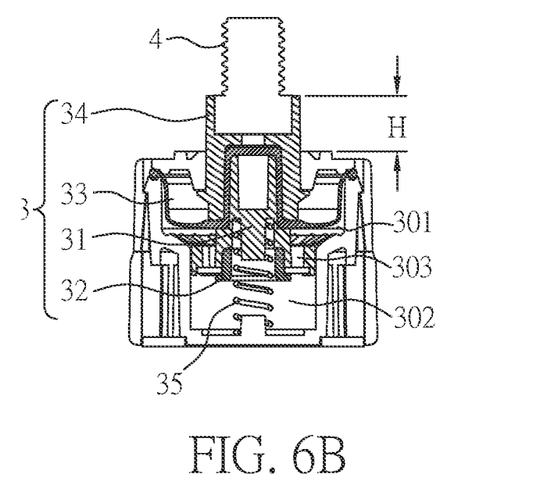
FIG. 6B is a cross-sectional view illustrating interior of the hydraulic buffering leg cushion, before compression thereof, according to the present invention.

Now references are made to FIG. 6A, a side view illustrating the hydraulic buffering leg cushion, before compression thereof, according to the present invention; and FIG. 6B, a cross-sectional view illustrating interior of the hydraulic buffering leg cushion, before compression thereof. As shown, at the moment that the hydraulic buffering leg cushion c stands in status of non-loading, namely the movable unit 3 has not yet started to compress the restoring spring 35, an effective maximum height H of adjustment can be obtained.

Figure 7A:
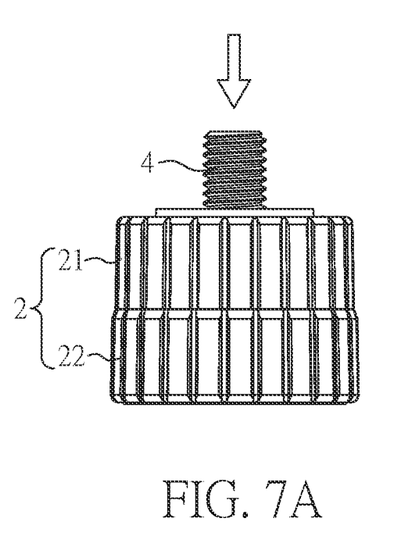
FIG. 7A is a side view illustrating the hydraulic buffering leg cushion, after compression thereof, according to the present invention.
Figure 7B:
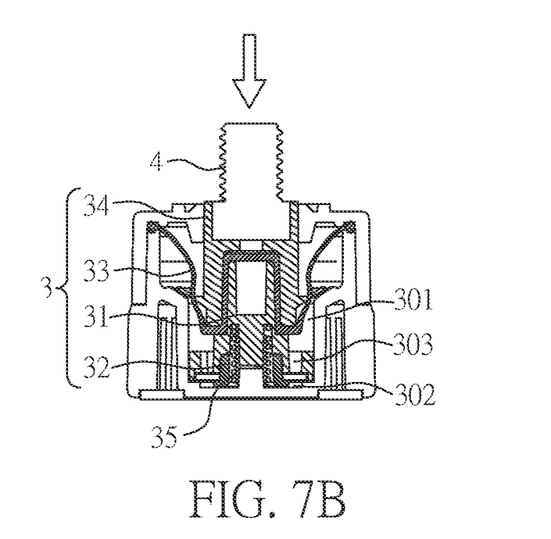
FIG. 7B is a cross-sectional view illustrating interior of the hydraulic buffering leg cushion, after compression thereof, according to the present invention.

Further, references are made to FIG. 7A, a side view illustrating the hydraulic buffering leg cushion, after compression thereof, according to the present invention; and FIG. 7B, a cross-sectional view illustrating interior of the hydraulic buffering leg cushion, after compression thereof. As shown, when the hydraulic buffering leg cushion c is subject to a force, the movable unit 3 moves downward and compresses the restoring spring 35. At this moment, the membrane assembly 32 presses against the piston 31, making the damping channel 303 unable to communicate with the first damping accommodating space 301 and the second damping accommodating space 302, namely, the one-way valve structure stands in a closed situation. This will provide a buffering effect to prevent the movable unit 3 from a rapid downward motion, making the downward pressure and the elastic force of the restoring spring 35 can gradually reach to a self-balance state. In contrast, when the hydraulic buffering leg cushion c is subject to a decreasing force, or returns to a non-loading status, the elastic recovery force of the restoring spring 35 will push up the movable unit 3, making the membrane assembly 32 do not press against the piston 31, so that the damping channel 303 can communicate with the first damping accommodating space 301 and the second damping accommodating space 302, namely, the one-way valve structure stands in an open situation. This will provide a buffering effect to prevent the movable unit 3 from a rapid uprising motion, making the downward pressure and the elastic force of the restoring spring 35 can gradually reach to a self-balance state. On the other hand, the hook 341 of the movable portion 34 can be engaged with the flange 211 of the upper cover 21, so as to refrain from the elastic recovery force of the restoring spring 35, to limit the utmost height that the movable unit 3 can adjust, and to return to a non-loading status.

Through the above-mentioned design, the piston 31 and the membrane assembly 32 form with a one-way valve structure in the hydraulic buffering leg cushion c, making the one-way valve structure closed as the movable unit 3 is pressed down; and otherwise, making the one-way valve structure opened as the movable unit 3 returns to uprising. As such, the damping oil has different flowing passages under the circumstances of pressing downward or uprising of the movable unit 3, so as to enhance sensitivity of the height adjustment for the supporting table 1. This will make the present invention suitable for a supporting table with a smaller-size restoring spring and with a lighter weight thereof.

Although the present invention has been explained in relation to its preferred embodiments, it is to be understood that many other possible modifications and variations can be made without departing from the scope of the invention as hereinafter claimed.

The invention claimed is:

1. A hydraulic buffering leg cushion, mounted to a supporting platform, comprising:
    a leg cushion body, provided with a leg cushion accommodating space, and including an upper cover, and a lower cover, wherein the upper cover is arranged on the lower cover;
    a movable unit, received in the leg cushion accommodating space, and including a piston, a membrane assembly, a rubber bowl, and a movable portion, wherein the rubber bowl is clamped, at its outer circumference, by and between the upper cover and the lower cover, so as to partition a damping accommodating space for receiving damping oil, and the damping accommodating space includes a first damping accommodating space located above the piston, and a second damping accommodating space located below the piston, and wherein the movable portion and the rubber bowl are pressed, in sequence, onto the piston, and the piston is provided with a damping channel for communicating with the first damping accommodating space and with the second damping accommodating space, and wherein the membrane assembly is disposed underneath the piston, so as to press against the piston and to make the damping channel unable to communicate with the first damping accommodating space and the second damping accommodating space, or on the other hand, the membrane assembly does not press against the piston so as to make the damping channel communicate with the first damping accommodating space and the second damping accommodating space, and the piston is connected with the lower cover through a restoring spring, and the restoring spring passes through the membrane assembly; and a fixed connecting member, fixedly arranged on the movable portion of the movable unit.

2. The hydraulic buffering leg cushion as claimed in claim 1, wherein the membrane assembly includes a membrane sheath, and a membrane piece which is sleeved to the membrane sheath.

3. The hydraulic buffering leg cushion as claimed in claim 1, wherein the lower cover is provided underneath with a rubber pad.

4. The hydraulic buffering leg cushion as claimed in claim 1, wherein the movable portion is provided with a hook for engaging with a flange around inner circumference of the upper cover.

5. The hydraulic buffering leg cushion as claimed in claim 1, wherein the fixed connecting member relates to a setscrew.

6. The hydraulic buffering leg cushion as claimed in claim 1, wherein the lower cover has a bottom with a diameter greater than a diameter of top of the upper cover.

\* \* \* \* \*